US 6,704,684 B2

(12) United States Patent
Beck

(10) Patent No.: US 6,704,684 B2
(45) Date of Patent: Mar. 9, 2004

(54) METHOD FOR DETERMINING MEASURING POINTS ON A WORKPIECE AND A MEASURING SYSTEM THEREFOR

(75) Inventor: Rolf Beck, Esslingen (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 10/125,600

(22) Filed: Apr. 19, 2002

(65) Prior Publication Data

US 2002/0185998 A1 Dec. 12, 2002

Related U.S. Application Data

(63) Continuation-in-part of application No. PCT/DE00/03730, filed on Oct. 20, 2000.

(51) Int. Cl.[7] .............................. G01B 7/28; G06F 15/00
(52) U.S. Cl. ....................... 702/152; 702/167; 702/168; 33/503; 33/504
(58) Field of Search .............................. 702/33, 94–95, 702/150, 152, 153, 167–168; 33/503, 504–505, 554, 559, 561

(56) References Cited

U.S. PATENT DOCUMENTS

| 4,769,763 A | * | 9/1988 | Trieb et al. ................. 702/168 |
| 5,152,072 A | * | 10/1992 | McMurtry et al. ............. 33/558 |
| 5,446,545 A | * | 8/1995 | Taylor ........................ 356/501 |
| 5,778,551 A | * | 7/1998 | Herklotz et al. .............. 33/554 |
| 6,044,569 A | * | 4/2000 | Ogihara et al. ............... 33/503 |

* cited by examiner

Primary Examiner—Bryan Bui
(74) Attorney, Agent, or Firm—Walter Ottesen

(57) ABSTRACT

The invention relates to a method for detecting measurement data on coordinate measuring and digitalizing machines. When the measuring times of the coordinate measuring machine and the sensor are determined by an electric signal (trigger), the equality thereof can be guaranteed and the influence of signal propagation delays can be excluded. The nth sensor information always corresponds to the nth machine information. Allocation is made easier when each value detected at a measuring time obtains an identifier. In one embodiment, surface points of a free forming surface can be detected during movement of the sensor on the coordinate measuring machine and by means of a measuring sensor. The measuring times are determined by an electric signal that is produced by the sensor and is transmitted to the coordinate measuring machine. The signal triggers distance measuring of the sensor as well as the output of the current machine position.

17 Claims, 2 Drawing Sheets

METHOD FOR DETERMINING MEASURING POINTS ON A WORKPIECE AND A MEASURING SYSTEM THEREFOR

RELATED APPLICATION

This is a continuation-in-part application of International patent application PCT/DE 00/03730, filed Oct. 20, 2000 and claiming priority of German patent application 199 50 869.0, filed Oct. 22, 1999.

FIELD OF THE INVENTION

The invention relates to a method for measuring geometric characteristics of workpieces on coordinate measuring machines or digitalizing machines by means of measuring apparatus, which supply measurement information as to geometric characteristics of the workpiece relative to the measuring apparatus, which is, in short, often characterized as measuring sensors.

Initial Comment

In the following, the abbreviation CMA is used for coordinate measuring machines as well as for digital machines.

BACKGROUND OF THE INVENTION

Today, mostly CMAs are used for detecting three-dimensional geometric variables. These CMAs are mostly equipped with switching probes which, when contacting the surface, generate an electric signal. With this signal, the positions of the individual linear or rotational axes of the CMAs are frozen, that is, the axial positions are copied into an output register. This data is then used in the known kinematic of the CMA, including the probe, to generate a measuring point in a stationary coordinate system. When generating a measuring point, partially more extensive error compensations are carried out, such as probe ball radius correction, geometric or thermal machine position error corrections. The basis for the fault correction and, in part, also for the determination of the kinematics, is mostly a calibration process.

If several points are sequentially measured in the same fixed coordinate system, the relative position of the measuring points in the spatially fixed coordinate system to each other is a measure for the relative position of the contact points on the workpiece surface. In this way, geometric quantities can be determined on the workpiece.

To an increasing extent, measuring sensors are preferably used in lieu of switching probes for detecting free-form surfaces. Contacting as well as contactless sensors are used. These sensors determine the position of the measuring point on the workpiece relative to the recording thereof, that is, in a sensor fixed coordinate system, hereinafter known as RST coordinate system. A sequence of measuring points is, as a rule, detected during the movement of the CMA and one speaks of a "scanning" operation.

For computing a measurement point in a stationary coordinate system, the sensor information in the RST coordinate system must be coupled in time synchronism with the information for the position of the sensor in the stationary coordinate system. In methods known at the present time, this takes place in that the result of the measurement of the sensor in the RST coordinate system is detected in time as close as possible to the result of the sensor position determination by the CMA in the stationary coordinate system in a mostly digital signal processing unit and, thereafter, a measuring point in the stationary coordinate system is computed from these two individual informations.

In the known method, so that the information from the sensor and the CMA originates indeed at the same time point, the times for obtaining the measurement value, the measurement value processing and the measurement value transmission, must have the same magnitude for the sensor and the CMA so that the time synchronous coupling of the results corresponds also to the same measurement time point.

Otherwise, the information of the sensor would be coupled to a position of the sensor which it did not have at the time point of obtaining the information and this would lead to an incorrect computation of the measuring points with the exception of some special cases.

There are systems known wherein, for unequal but respectively constant signal running times, a correction is preferably carried out via a delay path of the more rapid information utilizing a ring buffer; these systems, however, are subject to disturbances because the assumption of constant signal running times (especially for optical sensors having complex signal processing) cannot be guaranteed and the signal transmission time up to the point of the signal processing unit (at which both informations are detected simultaneously) is generally not constant. This applies primarily when the signal processing unit used is a complex multitasking operating system such as Windows NT.

Furthermore, all systems have as a precondition that the measurement data rate of sensor and CMA is the same, that is, a result from the sensor is coupled to a result from the CMA.

SUMMARY OF THE INVENTION

The method of the invention overcomes these disadvantages in that the time point of the measurement is determined by an electrical signal (trigger) for the CMA as well as for the sensor.

All CMAs, which are designed for operation with a switching probe, permit this function in that the trigger signal is treated like a signal of a switching probe. The sensors usable in accordance with the invention likewise have to exhibit a possibility for synchronization. This can be a trigger input for the exact determination of the measurement time point as well as an output signal (SYNC), which indicates the exact measurement time point. In the first case, a measurement data detection system needs to contain a trigger source in accordance with the method of the invention; in the second case, the sensor itself would function as a trigger source.

A signal processing unit in accordance with the method of the invention ensures that precisely one measurement result from the sensor and one measurement result from the CMA per trigger is further processed.

In contrast to known methods, different signal running times no longer have an effect because, in the signal processing unit, the simultaneousness of the measurement is determined by the sequence of the results and no longer by the time point of the detection of the results. Stated otherwise, the n-th result after an initialization of the CMA and the n-th result after an initialization of the sensor originate reliably at the same time point because they were triggered by the same trigger.

Since especially contactless sensors are essentially more dynamic than the CMA, different measurement data rates of sensor and CMA are purposeful and possible with the method according to the invention, preferably when the ratio of the measurement data rates is a whole number. In this case, for the computation of measurement points, the results of the CMA are interpolated in accordance with known methods so that, after the interpolation, the same amount of information is present from the CMA and from the sensor and can be processed further as with the same measurement data rate.

In order to make the identification more reliable as to which result belongs to the n-th trigger (for example, to detect possibly occurring signal transmission defects), the sensors as well as the CMA should, in a preferred variation of the method of the invention, in addition to its other informations, transmit a TAN-NR (transaction identifier) which is increased with each trigger and is again reset when a maximum number is exceeded. In this way, for a coupling of the CMA data and the sensor data, synchronism can be checked in a simple manner and synchronization reached.

In a preferred variation, at least the sensor and preferably also the CMA have a FIFO output memory which ensures that even under not real-time capable operating systems (such as Windows NT), a complete and clear transmission of each individual information per trigger is ensured. Especially with the high data rate, which is possible for contactless sensors, it is thereby prevented that the signal processing unit (because of loading with other tasks) cannot process the signal transmission within the time pregiven by the measurement data rate and therefore individual informations are not even processed further.

The FIFO output memory, especially in combination with the TAN-NR, permits, on the one hand, a very disturbance-free operation compared to present-day solutions and, on the other hand, it permits the information from sensors or CMA to be transmitted in selectable block sizes for several triggers instead of individually per trigger which significantly reduces the load of the signal processing unit because of the data transmission.

The method according to the invention therefore permits a significant increase of the measurement data rate with a simultaneous increase with respect to disturbance reliability and a reduction of the load of the signal processing unit without a significant increase of complexity of present-day conventional CMAs.

BREIF DESCRIPTION OF THE DRAWINGS

The invention will now be described with reference to the following therefore:

DESCRIPTION OF THE PREFERRED EMBODIMENTS OF THE INVENTION

Figure 1:
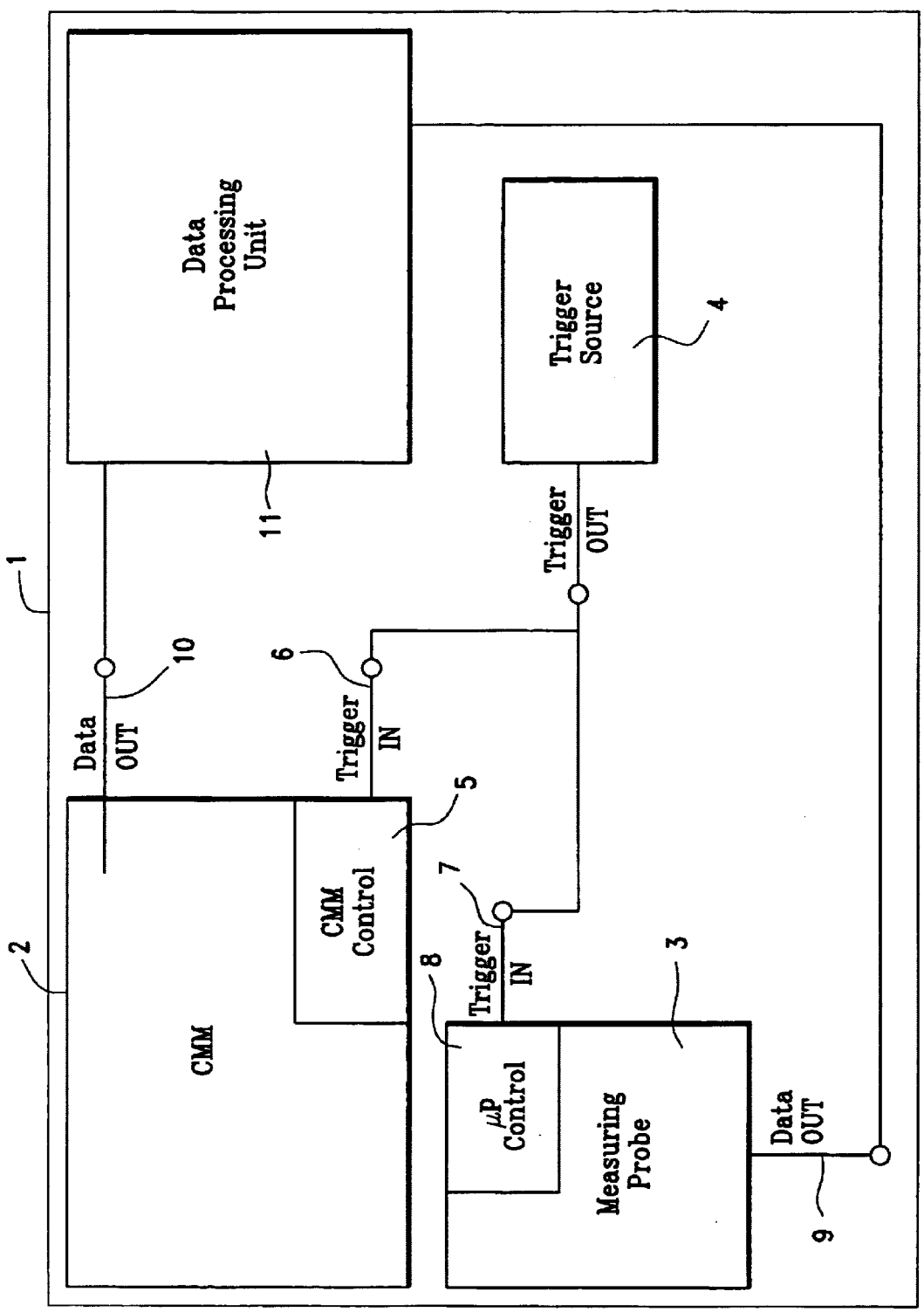
FIG. 1 shows a block diagram of a first embodiment of the invention.

The measuring system 1 in FIG. 1 includes a coordinate measuring apparatus 2 (CMM), a measuring sensor 3 (measuring probe), a signal processing unit 11 (data processing unit) and an external trigger source 4. The coordinate measuring apparatus includes its own internal control 5 (CMM-control) and the measuring sensor 3 includes its own internal control 8 (MP-control).

The measuring sensor 3 is accommodated on the coordinate measuring apparatus 2 in a manner known per se and is rotatable via this apparatus in at least three mutually perpendicular spatial directions movable relative to the workpiece as well as about additional rotational axes as required.

The controls 5 of the coordinate measuring apparatus 2 control the movements of the coordinate measuring apparatus 2 and therewith the positioning and, if required, the orientation of the sensor 3 in space and simultaneously control the generation of measurement values of the coordinate measuring apparatus. In a corresponding manner, the control 8 of the sensor 3 controls possible internal movements or measuring force generators within the sensor 3 as well as the measurement value generation of the sensor.

The controls (5, 8) of the coordinate measuring apparatus and of the sensor are autarchic, that is, both controls have their own clock generator and work frequencies whereby also the repetition rates of the measured value generation are determined in each case. Since the sensors usually exhibit a higher dynamic than coordinate measuring apparatus, the clock frequencies of the coordinate measuring apparatus and the sensor 3 are different. They distinguish from each other typically by one order of magnitude. Typical clock frequencies for coordinate measuring apparatus are approximately 100 Hz and typical clock frequencies of sensors 3 are approximately 3 KHz.

The two controls have respective trigger inputs (6, 7) via which the measurement value generation can be triggered; that is, when a specific trigger signal, for example a rising signal flank, is applied, the respective actual adjusting values and measurement values are read out and are read out via data outputs (9, 10) to the signal processing unit for further processing. With this further processing, the measurement values of the coordinate measuring apparatus 2 and the measured values of the sensor 3 are coupled to each other. The measured value recordation of the coordinate measuring apparatus as well as of the sensor is triggered by the same trigger signal. For this reason, it is ensured that the measurement value generation takes place simultaneously and, accordingly, measured values, which belong to each other in time, are generated with the coordinate measuring apparatus and with the sensor.

In the embodiment of FIG. 1, the trigger output lies directly on the trigger input 6 of the coordinate measuring apparatus as well as on the trigger input 7 of the sensor 3. In this case, the repetition rate of the trigger signal, which is generated by the trigger source 4, may not be greater than the maximum clock frequency of the coordinate measuring apparatus. It is, however, also possible to switch a frequency multiplier or frequency divider into one of the two signal lines in order to utilize the higher dynamic of the sensor 3.

Figure 2:
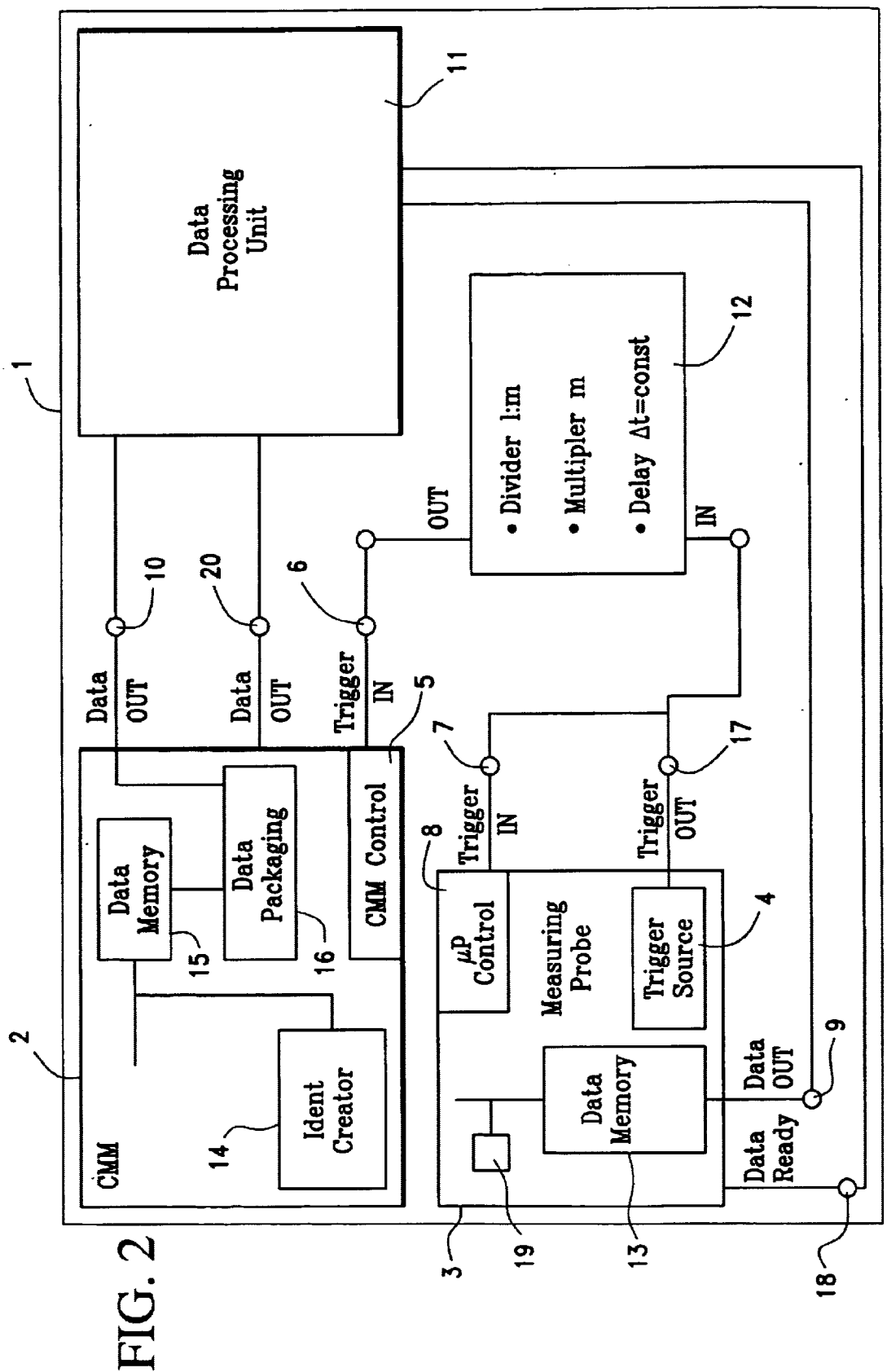
FIG. 2 shows a block diagram of a second embodiment of the invention.

In the embodiment of FIG. 2, the measuring sensor 3 has an internal trigger source 4 whose output signal 17, on the one hand, triggers the measurement value generation of the sensor 3 via the trigger input 7 of the sensor control 8 and, on the other hand, is applied to the trigger input of the coordinate measuring apparatus 2 via a frequency-multiplier/frequency-divider 12. The pulse repetition rate of the trigger 4 is adapted to the dynamic of the sensor 3 and the frequency-multiplier/frequency-divider 12 is so matched that the pulse repetition rate of the trigger signal is adapted to the lower repetition rate of the coordinate measuring apparatus. The pulse repetition rate of the trigger signal is, as a rule, too high by one order of magnitude. Additionally, the frequency-multiplier/frequency-divider 12 can generate a constant time delay in order to thereby compensate constant running time differences of the trigger signal.

The sensor 3 as well as the coordinate measuring apparatus each have, in addition to their own controls (5, 8), an identifier generator (14, 19). Each of these two identifier generators can be relatively simply configured as high-frequency counters, for example, with a counting rate of 10 MHz. The high-frequency counter counts the incoming trigger signals in each case. To each measured value, which is generated by the coordinate measuring apparatus 2 or by the sensor 3, the corresponding current count of the counter is then added as an identifier whereby later a clear assignment of the measurement values of the coordinate measuring apparatus and of the sensor can be guaranteed with the signal evaluation in the signal processing unit 11. These measured values correspond to each other and are accordingly triggered simultaneously. The counters can operate cyclically, that is, when reaching the maximum number, the counters again start counting anew from 1.

The coordinate measuring apparatus 2 as well as the sensor 3 have data stores (13, 15) wherein the respective measured values can be intermediately stored supplemented by respective identifiers. The capacity of the data stores (13, 15) should be adapted to the corresponding identifier generators (14, 19) so that the identifier is clear within each intermediately stored set of measured values, that is, the same identifier is not assigned to two measured values triggered at different time points.

The data stores (13, 15) are preferably configured as FIFO stores. In addition, the coordinate measuring apparatus 2 has a unit 16 with which several measured values of the coordinate measuring apparatus are grouped together to blocks in advance of the data transmission in order to relieve the signal processing unit 11 because the data transmission does not have to take place continuously. Here, it is especially practical to provide in the sensor for a corresponding unit for forming data blocks in advance of the data transmission even though this is not shown in FIG. 2.

In addition to the already mentioned trigger inputs (6, 7), the trigger output 17 of the sensor 3 and the measurement data outputs (9, 10), the coordinate measuring apparatus 2 and the sensor 3 include two further outputs (18, 20) which, to some extent, trigger the signal transmission. Signals are present at these outputs (18, 20), respectively, when sensor measured values are present, that is, when data packages are present ready for the data transmission. The application of these signals indicates to the signal processing unit 11 that a data transmission should take place and this unit then triggers the data transmission.

The coupling of each measured value with an identifier, which is assigned only to this measured value and which is, in turn, determined by the incoming trigger signals, permits erroneous time allocations to be excluded, which, for example, would otherwise be unavoidable in an overtriggering. If, for example, an additional trigger signal is generated, for example, because of a disturbance source (which trigger signal however does not trigger a measured value generation because it followed the previous trigger signal at too small a time distance), then the identifier, which is generated by this additional trigger signal, is not assigned to a measured value and is correspondingly not stored or transmitted. In a later evaluation in the signal processing unit, a conclusion can be drawn from the missing identifiers that the corresponding measured values are not present and, because of this information, the measured values of the sensor and of the coordinate measuring apparatus, which are triggered simultaneously, can be correctly assigned to each other.

Of course, the frequency divider ratio of the frequency-multiplier/frequency-divider 12 must be considered in the assignment of the respective measured values based on the identifiers. If the frequency divider ratio is, for example, 1/10, that is, the repetition rate of the trigger pulses arriving at the coordinate measuring apparatus amounts to 1/10th of the repetition rate of the trigger pulses arriving at the sensor 3, then the measured values of the sensors having the identifiers 1, 11, 21, 31 . . . are to be assigned to the measured values of the coordinate measuring apparatus having the identifiers 1, 2, 3, 4 . . . when each trigger pulse has led to a measured value. If, in contrast, no measured value is transmitted with the identifier 11, then it follows from this that the corresponding trigger pulse has not led to a measured value and, accordingly, the measured values of the sensors having the identifiers 1, 21, 31 . . . are to be assigned to the measured values of the coordinate measuring apparatus having the identifiers 1, 2, 3, 4 . . . .

Of course, also other identifiers can be generated and added to measured values in lieu of the previously described counts of the counters.

If, in lieu of an internal trigger of the sensor, an external trigger is used, then also this external trigger can have an additional counter which assigns a count of a counter to respective ones of the originally generated trigger pulses. With a transmission of these respective counter counts to the signal processing unit, the respective identifiers of the measured values and the external counts of the counter can be checked as to plausibility.

In lieu of using an internal trigger of the sensor, it is, of course, also possible to provide a trigger output on the coordinate measuring apparatus whose signal output then triggers the measured value recordation of the sensor, if required, after a suitable frequency multiplication.

What is claimed is:

1. A method for determining measurement points on a workpiece with a coordinate measuring apparatus having a measuring sensor, the method comprising the steps of:

causing the coordinate measuring apparatus to generate measured values at a first repetition rate;

causing the measuring sensor to generate measured values at a second repetition rate with said first and second repetition rates deviating from each other; and, triggering a generation of a sequence of measured values of the coordinate measuring apparatus and of the measuring sensor via respective trigger signal sequences which are in a fixed time relationship to each other.

2. The method of claims 1, wherein the known fixed relationship is "equality" so that the generation of corresponding ones of the measured values by the coordinate measuring apparatus as well as the generation of measured values by the measuring sensor takes place at the same time.

3. The method of claim 1, wherein the coordinate measuring apparatus and/or the sensor generates a signal with the presence of a new measured value.

4. The method of claim 3, wherein a signal processing unit reads the signal and reads out the new measured value.

5. The method of claim 1, wherein the coordinate measuring apparatus and/or the sensor stores the sequence of measured values and the sequence of measured values is thereafter read out in exactly the time sequence of the measured value generation by a signal processing unit or is transmitted to a signal processing unit.

6. The method of claim 1, wherein the measured values of the coordinate measuring apparatus and/or the measured values of the sensor are transmitted in each case by blocks to a signal processing unit.

7. A method for determining measurement points on a workpiece with a coordinate measuring apparatus having a measuring sensor, the method comprising the steps of:

causing the coordinate measuring apparatus to generate measured values at a first repetition rate;

causing the measuring sensor to generate measured values at a second repetition rate with said first and second repetition rates deviating from each other; and, triggering a generation of a sequence of measured values of the coordinate measuring apparatus and of the measuring sensor via respective trigger signal sequences which are in a fixed time relationship to each other;

wherein the trigger signal sequences for generating measured values of the coordinate measuring apparatus and the trigger signal sequences for generating measured values of the sensor are derived from each other via frequency multiplication or frequency division.

8. The method of claim 7, wherein the coordinate measuring apparatus generates a trigger signal sequence which is an index for the time sequence of the generation of measured values of the coordinate measuring apparatus and from which the trigger signal sequence is generated by frequency multiplication for the generation of measured values of the sensor.

9. The method of claim 7, wherein the measuring sensor generates a trigger signal sequence which is an index for the time sequence of the generation of measured values of the sensor and from which the trigger signal sequence for the generation of measured values of the coordinate measuring apparatus is generated via frequency division.

10. The method of claim 7, wherein, additionally, a fixed pregiven time shift is generated between the trigger signal sequence for generating respective measured value of the sensor and the trigger signal sequence for generating the respective measured value of the coordinate measuring apparatus or the fixed pregiven time shift results because of the signal running time.

11. The method of claim 7, wherein, in a subsequent signal evaluation, additional values are generated by an interpolation in the sequence of measured values having the lower repetition rate, these values being assigned to the same-time generated measured values of the sequence of measured values having the higher repetition rate.

12. A method for determining measurement points on a workpiece with a coordinate measuring apparatus having a measuring sensor, the method comprising the steps of:

causing the coordinate measuring apparatus to generate measured values at a first repetition rate;

causing the measuring sensor to generate measured values at a second repetition rate with said first and second repetition rates deviating from each other; and, triggering a generation of a sequence of measured values of the coordinate measuring apparatus and of the measuring sensor via respective trigger signal sequences which are in a fixed time relationship to each other;

wherein an additional clock generator is provided for making available an external trigger signal sequence and the trigger signal sequence for generating measured values of the sensor and the trigger signal sequence for generating measured values of the coordinate measuring apparatus are generated by frequency division and/or frequency multiplication from this external trigger signal sequence.

13. A method for determining measurement points on a workpiece with a coordinate measuring apparatus having a measuring sensors the method comprising the steps of:

causing the coordinate measuring apparatus to generate measured values at a first repetition rate;

causing the measuring sensor to generate measured values at a second repetition rate with said first and second repetition rates deviating from each other; and, triggering a generation of a sequence of measured values of the coordinate measuring apparatus and of the measuring sensor via respective trigger signal sequences which are in a fixed time relationship to each other;

wherein a cyclically clear indicator is supplied to each of the measured values of the coordinate measuring apparatus and/or each of the measured values of the sensor, which indicator is defined up to a maximum number of measured values and repeats itself after reaching the maximum number.

14. A measuring system comprising:

a coordinate measuring apparatus and a measuring sensor accommodated on said coordinate measuring apparatus;

said coordinate measuring apparatus functioning to generate measured values at a first repetition rate;

said measuring sensor functioning to generate measured values at a second repetition rate with said first and second repetition rates deviating from each other; and, said coordinate measuring apparatus functioning to generate a sequence of measured values and said measuring sensor likewise functioning to generate a sequence of measured values triggered by respective trigger signal sequences which are in a fixed time relationship to each other.

15. A measuring system comprising:

a coordinate measuring apparatus and a measuring sensor accommodated on said coordinate measuring apparatus;

said coordinate measuring apparatus functioning to generate measured values at a first repetition rate;

said measuring sensor functioning to generate measured values at a second repetition rate with said first and second repetition rates deviating from each other; and, at least one of said coordinate measuring apparatus and said measuring sensor having a unit which supplies a cyclically defined indicator to each measured value of the coordinate measuring apparatus and/or to each measured value of the sensor, the indicator being defined up to a maximum value of measured values and which repeats after the maximum number is reached.

16. The measuring system of claim 15, further comprises an evaluation unit which assigns the individual measured values of the sensor to the same-time generated measured values of the coordinate measuring apparatus based on the identifiers.

17. The measuring system of claim 16, wherein said system comprises a triggering unit which triggers the recordation of measuring values and wherein the triggering unit additionally triggers the change of the identifiers.

* * * * *

UNITED STATES PATENT AND TRADEMARK OFFICE
CERTIFICATE OF CORRECTION

PATENT NO. : 6,704,684 B2
DATED : March 9, 2004
INVENTOR(S) : Rolf Beck

It is certified that error appears in the above-identified patent and that said Letters Patent is hereby corrected as shown below:

Title page,
Between Item "[22] Filed:     Apr. 19, 2002" and "[65] Prior Publication Data", insert -- [30]     Foreign Priority Application Data
       Oct. 22, 1999      (DE) ……………………..199 50 869 --

Column 1,
Line 19, delete "Initial Comment".

Column 3,
Line 43, delete "BREIF" and substitute -- BRIEF -- therefor.
Line 45, delete "following therefore:" and substitute -- drawings wherein: -- therefore.

Column 6,
Line 12, delete "1, 2, 3, 4 …." and substitute -- 1, 3, 4,    …. -- therefor.
Line 43, delete "claims" and substitute -- claim -- therefor.

Column 7,
Line 62, delete "sensors" and substitute -- sensor, -- therefor.

Column 8,
Line 52, delete "15," and substitute -- 15 -- therefor.

Signed and Sealed this

Tenth Day of August, 2004

JON W. DUDAS
*Acting Director of the United States Patent and Trademark Office*